United States Patent [19]

Krull

[11] Patent Number: 4,506,356
[45] Date of Patent: Mar. 19, 1985

[54] SERVICE INTEGRATED DIGITAL TRANSMISSION SYSTEM OPERATING IN TIME MULTIPLEX

[75] Inventor: Klaus Krull, Weissach, Fed. Rep. of Germany

[73] Assignee: Licentia Patent-Verwaltungs-GmbH, Frankfurt am Main, Fed. Rep. of Germany

[21] Appl. No.: 324,659

[22] Filed: Nov. 24, 1981

[30] Foreign Application Priority Data

Nov. 27, 1980 [DE] Fed. Rep. of Germany ....... 3044702

[51] Int. Cl.³ ............................................. H04B 9/00
[52] U.S. Cl. ........................................... 370/1; 370/3; 371/66; 455/607; 455/612
[58] Field of Search ....................... 455/2, 5, 606, 607, 455/608, 610, 612, 617, 618, 343; 370/1, 3, 71, 73; 371/66; 358/84, 85; 364/200 MS File, 900 MS File; 375/58

[56] References Cited

U.S. PATENT DOCUMENTS

| | | | |
|---|---|---|---|
| 3,453,601 | 7/1969 | Bogert et al. | 364/200 |
| 3,599,100 | 8/1971 | Ward | 455/343 |
| 3,651,471 | 3/1972 | Haselwood et al. | 455/2 |
| 4,061,577 | 12/1977 | Bell | 370/3 |

FOREIGN PATENT DOCUMENTS

| | | | |
|---|---|---|---|
| 2844979 | 4/1980 | Fed. Rep. of Germany | 455/600 |
| 1032081 | 6/1966 | United Kingdom | 371/66 |

OTHER PUBLICATIONS

Welzenbach et al.-The Application of Optical Systems for Cable TV, NTG Fachber(Germ.), vol. 73, 1980, pp. 46-50.
Cotten et al., Fiber Optic Digital Video Systems for Commercial TV Trunking Applications-Conf. Proc. Spie., Wash., D.C., 28-29, Mar. 1978, pp. 53-62.
The International Symposium on Subscriber Loops and Services, Mar. 1978, pp. 39-43: "Optical Fibre Transmission Developments and the Local Loop".
Patents Abstracts of Japan, vol. 5, No. 19, Feb. 4, 1981, JP-A-55-147844.
Patents Abstracts of Japan, vol. 3, No. 58, May 18, 1979: JP-A-54-37402.
IEEE Transactions on Communications, vol. COM-27, No. 2, Feb. 1979: "Optical Switching System Experiment".

Primary Examiner—Joseph A. Orsino, Jr.
Attorney, Agent, or Firm—Spencer & Frank

[57] ABSTRACT

A terminal device for use in a service integrated, multiplex digital signal transmission system which includes an optical fiber waveguide line connected to the terminal for conducting a light signal and a member for modulating the light signal with multiplexed narrowband signals and multiplexed broadband signals, the terminal device including narrowband signal processing devices connected to the optical fiber waveguide line for transforming only narrowband signals between a multiplexed state and a demultiplexed state, broadband signal processing devices connected to the optical fiber waveguide line for transforming only broadband signals between a multiplexed state and a demultiplexed state, a member connected for normally supplying operating power to said signal processing means from local utility mains, a charge accumulator for supplying operating power in the event of interruption of the power supply by the local mains, and elements connected for switching the terminal device to effect signal transmission at a reduced bit rate in the event of such local power interruption. The terminal device further includes a signal detector connected for monitoring signal transmission and connected to the switching elements for causing operating power to be supplied from the accumulator for signal processing only during times when signal transmission is taking place.

5 Claims, 2 Drawing Figures

4,506,356

SERVICE INTEGRATED DIGITAL TRANSMISSION SYSTEM OPERATING IN TIME MULTIPLEX

BACKGROUND OF THE INVENTION

The present invention relates generally to a service integrated digital time multiplexed transmission system.

In copending U.S. application Ser. No. 324,662 filed by Hans-Jürgen Schmack and Erich Rauth on Nov. 24th, 1981, and claiming priority of German Patent application P No. 30 44 605.0 of Nov. 27th, 1980, there is disclosed a transmission system of the above type having a commercial power buffered accumulator, or battery, which takes over the supply of operating power when there is an interruption in commercial power and, in such case, transmission over the optical fiber waveguide system is adjusted to a reduced bit rate.

SUMMARY OF THE INVENTION

It is an object of the present invention to save even more energy in a system of this type so as to be able to bridge a commercial power interruption for an even longer period of time.

It is a further object of the present invention to terminate connection of even narrowband transmission and reception components to the charge accumulator when no narrowband signals are being transmitted or received.

The above and other objects are achieved in accordance with the present invention by providing a signal detector which is responsive to narrowband signals being received or transmitted during a power supply outage. The detector operates a switch which disconnects the conventional charge accumulator from the narrowband transmitter and receiver when no transmitted or received signals are present in order to reduce further the current drain on the battery.

With the transmission system according to the present invention it is possible to maintain emergency operation over longer periods of time if there is an interruption in commercial power supply and to do this in an energy saving manner. With the present invention it is also possible to use a battery, or charge accumulator, which has a smaller capacity and thus a smaller volume. The additional expense to implement the invention is relatively small.

BRIEF DESCRIPTION OF THE DRAWINGS

The FIG. 1 is an electronic block diagram of a preferred embodiment of the invention for devices at a subscriber terminal, wherein narrowband multiplex signals are below the broadband multiplex signals with respect to frequency.

DESCRIPTION OF THE PREFERRED EMBODIMENTS

Figure 1:
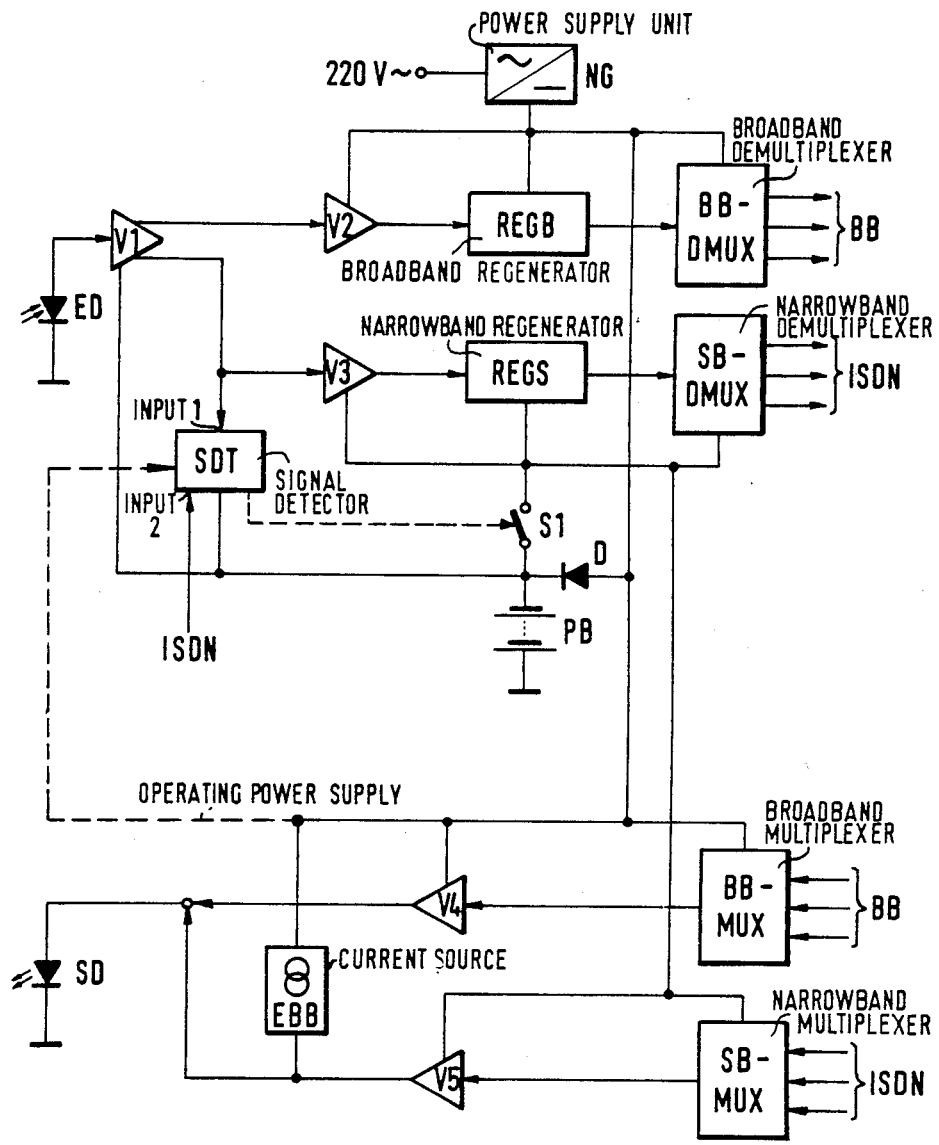

The upper portion of the FIG. 1 shows the receiving portion and the lower part the transmitting portion device at a subscriber terminal. The lines provided with arrows carrying information signals in the direction of the associated arrows, and the lines not associated with arrows carry operating power supply.

The receiving portion includes a light receiver in the form of a photodiode ED, a main amplifier V1, a broadband branch composed of an amplifier V2, a broadband signal regenerator REGB and a broadband demultiplexer BB-DMUX, and a narrowband branch composed of an amplifier V3, a narrowband signal regenerator REGS and a narrowband demultiplexer SB-DMUX.

The circuit units of the broadband branch are fed directly via a power supply unit NG by the local utility power mains, while the narrowband units are fed via a switch S1 by a buffer battery PB, the latter being maintained charged by the mains power via a diode D. Receiver diode ED and main amplifier V1, as well as a signal detector SDT provided according to the invention, are fed directly and constantly by the battery PB. The signal detector SDT monitors an incoming narrowband multiplex signal ISDN and detects when the associated subscriber is being called, which causes the switch S1 to be actuated and the narrowband circuit units to be switched on.

Advantageously the signal detector SDT is designed in such a manner that it performs an integration of the incoming signals. When a given voltage threshold is exceeded, the switch S1 is caused to close. Existing broadband signals have no effect since, with a suitable selection of the integration constant, a constant voltage results.

The operation of the narrowband branch is maintained as long as the narrowband communication connection is in existence. Once this connection is broken, no more signals are transmitted, whereupon the signal detector SDT disconnects the narrowband branch, by opening of switch S1, from the battery. However, if another narrowband communication is received, the narrowband branch is reconnected through switch S1.

The transmitting portion is treated correspondingly. The broadband branch with broadband multiplexer BB-MUX and amplifier V4 are fed by the power supply unit NG and therefore will not be in operation when the utility power is interrupted. Diode D constitutes a means for preventing current flow to the broadband component groups from the battery PB. The narrowband branch with narrowband multiplexer SB-MUX and amplifier V5 is supplied with power from the buffer battery PB when switch S1 is closed. A transmitter diode SD, which may be an LED, is supplied, on the one hand, by a current source EBB forming part of the power supply unit NG which makes broadband transmissions possible. If utility power is interrupted, the current source EBB is switched off, but the current pulses furnished by the battery powered amplifier V5 are sufficient to actuate the transmitting diode SD in a pure narrowband operation.

The present invention is of course applicable not only to digital broadband and narrowband multiplex signals combined in frequency multiplex but is also usable for broadband and narrowband signals which are combined in single stage or multistage time multiplex.

Figure 2:
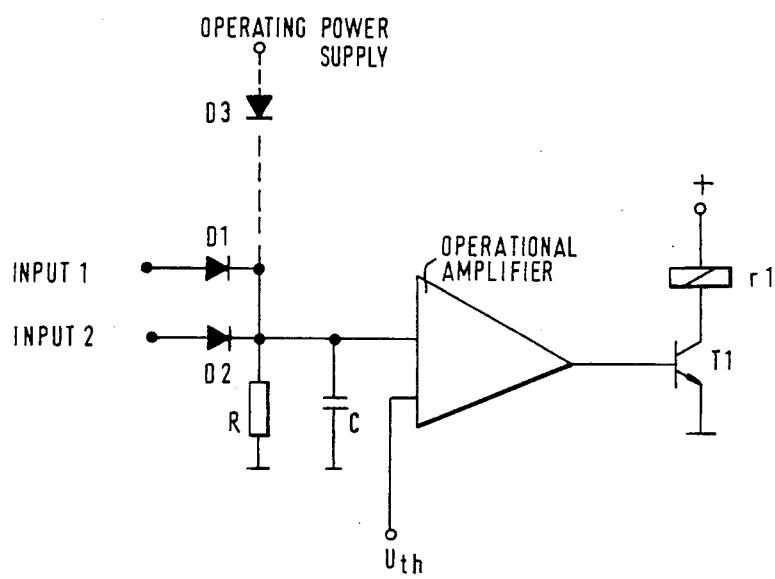
FIG. 2 shows a circuit diagram of a preferred embodiment of the signal detector SDT.

FIG. 2 shows a preferred embodiment of the signal detector SDT. The received and transmitted narrowband signals are applied to the inputs 1 and 2, respectively. These signals are digital multiplex signals, which include speech and date information and are transmitted in an integrated speed and date network (ISDN).

An occurring signal is rectified by decoupling diodes D1 or D2, respectively, and is integrated by an integration circuit, consisting of resistor R and capacity C. The integrated signal is compared with a threshold voltage $U_{th}$ by an operational amplifier; if it exceeds this threshold voltage, a transistor T1 is switched on, activating a relay R1, by which the switch S1 is closed.

Optionally the signal detector SDT has a third input, by which the integration circuit is connected to the operating power supply via a third decoupling diode D3. If operating power supply is present, the signal detector SDT remains in the mode wherein switch S1 is closed.

The offer components of the terminal device are described in "Contrasting Fiber-Optic-Component-Design Requirements in Telecommunications," by Personick et al in Proceedings of the IEEE Vol. 68 No. 1 Oct. 1980 and in Direct Modification of DHS-Laser, "by Chown et al in Electronics letters Vol. 9 No. 2 Jan. 1973.

It will be understood that the above description of the present invention is susceptible to various modifications, changes and adaptations, and the same are intended to be comprehended within the meaning and range of equivalents of the appended claims.

What is claimed is:

1. In a terminal device for use in a service integrated, multiplex digital signal transmission system which includes an optical fiber waveguide line connected to the terminal device for conducting a light signal and means for modulating the light signal with multiplexed narrowband signals and multiplexed broadband signals, the terminal device including narrowband signal processing means connected to the optical fiber waveguide line for transforming only narrowband signals between a multiplexed state and a demultiplexed state, broadband signal processing means connected to the optical fiber waveguide line for transforming only broadband signals between a multiplexed state and a demultiplexed state, means connected for normally supplying operating power to said broadband and narrowband signal processing means from local utility mains, a charge accumulator for supplying operating power in the event of interruption of the power supply by the local mains, and switching means connected to the accumulator and narrow band signal processing means for supplying operating power to said narrowband signal processing means from said charge accumulator to effect signal transmission at a reduced bit rate in the event of such local power interruption, the improvement comprising signal detector means for monitoring if narrowband signals are transmitted or not and connected to said switching means for causing operating power to be supplied from said accumulator for signal processing only during times when signal transmission is taking place.

2. An arrangement as defined in claim 1 wherein said switching means is controlled by said signal detector means to supply operating power from said accumulator only to said narrowband signal processing means in the event of such local power interruption.

3. An arrangement as defined in claim 2 wherein said signal detector means is operative to cause operating power to said narrowband signal processing means from said accumulator only during times when a narrowband signal transmission is taking place.

4. An arrangement as defined in claim 1, 2 or 3 wherein said signal detector means comprise an integrator connected to receive a transmission signal and a threshold value switch connected to the output of said integrator for controlling said switching means as a function of the relation between the value of the signal at the output of said integrator and a selected threshold value.

5. An arrangement as defined in claim 1 wherein said broadband and narrowband signal processing means are each connected directly to said optical fiber waveguide line and said switching means is connected for supplying operating power only to said narrowband signal processing means in the event of such local power interruption.

* * * * *